Nov. 8, 1966   W. ANGST   3,283,583
COMPENSATING MECHANISM FOR AIRCRAFT ALTIMETER
Filed March 15, 1966

INVENTOR.
WALTER ANGST
BY
OSTROLENK, FABER, GERB & SOFFEN
ATTORNEYS

United States Patent Office 3,283,583
Patented Nov. 8, 1966

3,283,583
COMPENSATING MECHANISM FOR AIRCRAFT ALTIMETER
Walter Angst, Douglaston, N.Y., assignor to Kollsman Instrument Corporation, Elmhurst, N.Y., a corporation of New York
Filed Mar. 15, 1966, Ser. No. 534,472
3 Claims. (Cl. 73—386)

This application is a continuation-in-part of copending application, Serial No. 276,271, now abandoned, filed April 29, 1963, entitled "Compensating Mechanism for Aircraft Altimeter," in the name of Walter Angst and assigned to the assignee of the instant application.

This invention relates to a novel mechanism for an aircraft altimeter for compensating for errors due to static system defects in the altimeter reading, and more particularly to a novel mechanical static pressure error compensating device for altimeters which can be utilized in subsonic, transonic or supersonic aircraft.

As employed in the present specification and the claims appended hereto, the term static system defect refers to the error in altitude due to the difference in pressure at the static ports operatively associated with the altimeter and the free stream static pressure. Such defect is caused by the characteristics of the air flow in the region of the static vents of the aircraft and has a magnitude generally considered to be a function of the Mach number of the aircraft.

The high density air traffic of recent years has made it imperative to develop altimeters providing altitude information which is subject to only a slight degree of error. While, in recent years, basic altimeter mechanisms have been so improved that most inherent instrument errors are well within practical manufacturing and operational requirements, little has been heretofore accomplished to compensate for the static system defect in altimeter readings. One all-mechanical device for compensating for static system defects in altimeter readings is disclosed and claimed in copending application Serial No. 277,792, filed May 3, 1963, relating to an "All-Mechanical Compensating Altimeter." The present invention relates to another such mechanism for compensating for the static system defect in an aircraft altimeter.

A primary object of the present invention, therefore, is to provide a relatively simple compensating mechanism for correcting the static system defect in aircraft altimeters, which mechanism can readily be employed in altimeters for use with aircraft adapted to travel at subsonic, transonic or supersonic speeds.

Other objects and advantages of the invention will be apparent from the following description thereof.

In accordance with this invention, the static system defect is compensated for in an aircraft altimeter comprising a pressure sensitive container subjected to the static pressure at the aircraft's altitude, which container is connected by a mechanical linkage to a suitable indicating means. The compensating mechanism includes a Mach number responsive element, preferably a differential diaphragm, which is movable as a function of the Mach number of the aircraft to correct for the static system defect. This mechanism is connected to and varies the position of a member in the mechanical linkage of the altimeter to thereby vary the motion imparted to the linkage by the pressure sensitive container and effect the desired correction.

Reference is now made to the following detailed description taken in connection with the accompanying drawing showing, as illustrative only, a preferred embodiment of the invention. In the drawing.

Figure 1:
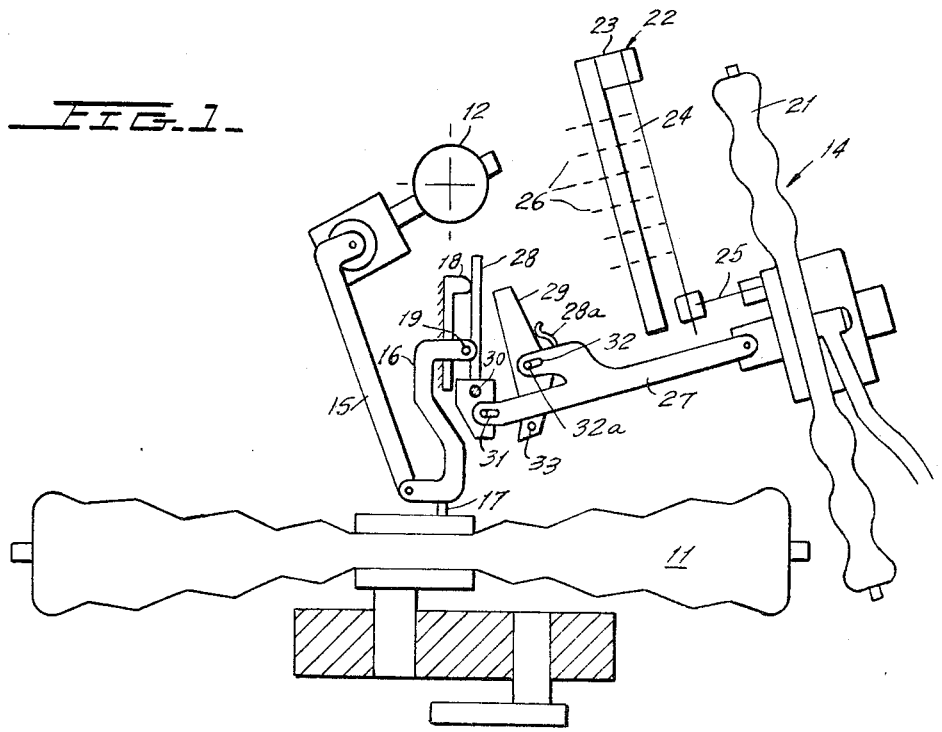
FIGURE 1 is a schematic diagram of a preferred form of altimeter compensating mechanism.

Referring to the drawing, the altimeter shown in FIGURE 2 includes a pair of static pressure sensing aneroids 11, each of which is connected to a rocking shaft 12; the rocking shafts are coupled in turn by a mechanism described hereinafter to an altitude indicating counter 13. Each aneroid 11 is connected to the corresponding rocking shaft 12 by a mechanical linkage associated with a compensating mechanism, indicated generally at 14 in FIGURE 1, which have been omitted from FIGURE 2 for purposes of clarity.

Figure 2:
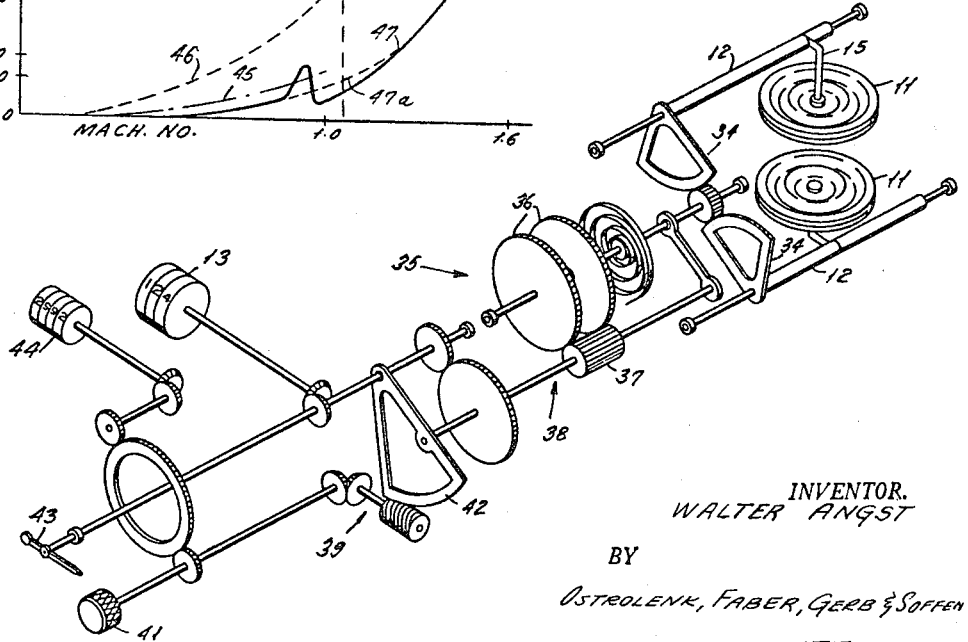
FIGURE 2 is a schematic perspective view of an altimeter incorporating the compensating mechanism of FIGURE 1.

As shown in FIGURE 1, the mechanical linkage coupling each aneroid to its associated rocking shaft includes a conventional altitude link 15 which, instead of being pinned directly to the aneroid (see FIGURE 2), is secured to an S-shaped correction arm 16 mounted for pivotal movement on the aneroid by means of a spring fulcrum 17. The end of the correction arm 16 opposite from its connection to the altitude link 15 has a follower pin 19 bearing against a compensating lever 28. The compensating mechanism 14 effects pivotal movement of correction arm 16, thereby introducing a correction into the mechanical linkage which compensates for Mach number responsive error of the static pressure sensing aneroid 11 in a purely mechanical manner.

Specifically, the compensating mechanism includes a differential diaphragm 21 for measuring the difference between the stagnation pressure at the head of the Pitot tube and the static pressure corresponding to the aircraft's altitude. The Mach number is known to be functionally related to the ratio of these quantities, and the movement of the differential diaphragm 21 is thus a function of the Mach number.

The differential diaphragm is an airspeed-type diaphragm of the log $\Delta P$ type, where $\Delta P$ is the difference between total pressure (in Pitot tube) and the actual static altitude pressure. Since a true log $\Delta P$ measurement cannot be performed by the diaphragm alone, a restraining system 22 is preferably associated with the diaphragm. The restraining system includes a support 23 having a flexible member 24 mounted thereon, which is biased against a link 25 connected to the diaphragm 21. The biasing force on the flexible member is altered by adjusting screws extending through the support 23 and engaging the flexible member 24. The adjusting screws, which are schematically illustrated at 26, effect a change in the effective length of the flexible member 24 and thus vary the restraining characteristics imposed on the differential diaphragm 21.

A link 27 is connected at one end to the differential diaphragm; the opposite end of the link is secured to a pair of compensating levers 28 and 29. The first compensating lever 28 is mounted for pivotal movement about a fixed pivot pin 30 and is additionally secured within a slot 31 in the link 27. It will also be noted in FIGURE 1 that a spring 28a is fastened to link 27 and bears against lever 29, turning lever 29 counterclockwise so that the pin 32a of lever 29 is pressed against the left side of slot 32. Pin 32a is free to move to the right in slot 32 whenever lever 29 pushes lever 28 against fixed stop 18. This condition can occur at high differential pressure and zero correction. This arrangement will then protect the mechanism from damage due to the force of the differential pressure diaphragm. When the ratio of actual static altitude pressure over the theoretical altitude pressure is unity, the first compensating lever 28 is positioned as shown in FIGURE 1, parallel to and in abutting relation with respect to the fixed stop finger 18, thus producing no correction. Upon expansion of the differential diaphragm 21 the link 27 is moved to the left viewing FIGURE 1, thereby pivoting the compensating lever 28 clockwise about the fixed pivot 30 and the correction arm 16 about fulcrum 17. For any given value of differential pressure, the lever 28 pivots into an angular position proportioning the correcting effect of the compensating arm 16 to the altitude output of the aneroid 11 (which approximates log $P_s$) and the output of the diaphragm 21.

It will be understood that the calibration of the correction for any given altimeter is accomplished by an appropriate adjustment of the restraining system 22 for the differential diaphragm, and the relative positioning of the correction arm 16 and the associated compensating levers 28 and 29.

For those altimeters utilized in supersonic aircraft wherein a nose-boom static error occurs, a sharp cut-off in the correction made by the compensating mechanism 14 is necessary after the shock wave has passed the static orifice. This is the case, since the static system defect becomes approximately negligible immediately after the shock wave has passed the static ports (see curve 46 in FIGURE 3, discussed hereinafter). To effect the necessary cut-off the second compensating lever 29 is secured within a slot 32 in the link 27, pivoting in opposition to the first lever 28 about a fixed pivot pin 33. When the first lever 28 is pivoted into contact with the second lever 29, the latter drives the former, together with the correction arm 16 back to the zero correction position shown in FIGURE 1, over a relatively short period. The slot 31 has a length sufficient to accommodate the lost motion of the lever 28 when driven back to the zero correction position by lever 29.

The compensating mechanism described above is independent of the altitude mechanism thereby eliminating the necessity for additional shafts in the altitude gear train. Referring to FIGURE 2, the altitude mechanism coacting therewith includes a pair of sector gears 34 driven by the rocking shafts 12. As noted above, the rocking shafts are actuated by the previously described aneroid-responsive mechanical linkage and the associated compensating mechanism 14.

A reverted gear train 35 is driven by the sector gears 34, thereby effecting the setting of the altitude indicating counter 13. The gear train includes a pair of split wheels 36 engaging a pinion 37 which is mounted on a pivotable cradle 38. A worm and gear assembly 39 actuated by a manual correction knob 41 is provided for correcting the barometric setting; the worm and gear assembly 39 is connected to a sector gear 42 which introduces the correction into the gearing connected to the altitude indicating counter 13 by means of the planetary feature of cradle 38. A conventional needle indicator 43 and barometric setting counter 44 may also be provided in geared relation with the manually actuated correction mechanism.

Figure 3:
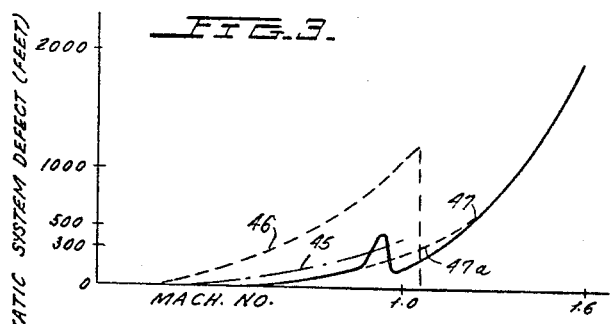
FIGURE 3 is a graph of the static system defects in different types of aircraft in which the compensated altimeter mechanism of the invention can be utilized.

The compensating mechanism described above may be employed to correct the static system defects in various types of subsonic, transonic and supersonic aircraft. Referring to FIGURE 3, the static system defect for one type of subsonic aircraft is indicated at 45. The altitude error in such an aircraft gradually increases to a maximum of about 300 feet at about Mach 1.0. It has been found that the compensating mechanism of the invention corrects such error within 40 feet or 90% of the static error, whichever is greater.

The static system defect affecting altimeter readings associated with a second type of aircraft is indicated by curve 46 is FIGURE 3. Assuming that a straight pressure-operated Mach indicator has at best an accuracy of 0.01, it has been found that the compensating mechanism described is capable of correcting the altimeter reading of this type of aircraft to within a tolerance of ±0.02 M.

The error curve for a third type of aircraft is shown at 47 in FIGURE 3. It will be noted that an altitude error in such a supersonic aircraft may approach 2,000 feet at Mach 1.6, an error which is substantially greater than that occurring in the subsonic region. It has been found that a correction is produced of the order of that described above in connection with curve 46, and that the particular "saw tooth" type error occurring in the region between subsonic and supersonic regions is averaged out to a smooth curve, as indicated at 47a, utilizing the present device.

Since certain changes may be made in the preferred embodiment of the aircraft altimeter compensating mechanism described without departing from the scope of the present invention, it is intended that all matter contained in the above description and shown in the accompanying drawing shall be interpreted as illustrative and not in a limiting sense.

The embodiments of the invention in which an exclusive privilege or property is claimed are defined as follows:

1. A static pressure arm correcting mechanism for an altimeter; said altimeter including a pressure sensitive capsule having a flexible output link, a rocking shaft, an indicator means and an altitude link connected at one end thereof to said flexible rocking shaft; said correcting mechanism including a compensating link, first and second pivotally supported compensating levers, a differential diaphragm expandable in accordance with Mach number, and connection link means connected to said first and second compensating levers and adapted to rotate said first and second compensating levers about their pivotal supports and in opposing directions; one end of said compensating link pivotally connected to the other end of said altitude link; a portion of said compensating link connected to said flexible output link with said flexible output link serving as a fulcrum for rotation of said compensating link; the other end of said compensating link abutting one side of said first compensating lever whereby expansion of said differential diaphragm causes rotation of said first compensating lever and subsequent rotation of said compensating link about its said connection to said flexible output link, thereby to move said altitude link to an adjusted position related to Mach number.

2. The device as set forth in claim 1 which includes respective lost motion connection means interposed between said first and second compensating links and said connection link means.

3. The device as set forth in claim 1 wherein said compensating link is S-shaped.

References Cited by the Examiner

UNITED STATES PATENTS 3,160,006   12/1964   Johanson _____ 73—182

LOUIS R. PRINCE, *Primary Examiner.*